United States Patent
Thüringer et al.

(10) Patent No.: US 6,507,130 B1
(45) Date of Patent: Jan. 14, 2003

(54) DATA CARRIER WITH PROTECTION AGAINST SPY OUT

(75) Inventors: Peter Thüringer, Graz (AT); Edgar Rieger, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/582,672

(22) PCT Filed: Oct. 27, 1999

(86) PCT No.: PCT/EP99/08258

§ 371 (c)(1),
(2), (4) Date: Jun. 29, 2000

(87) PCT Pub. No.: WO00/26868

PCT Pub. Date: May 11, 2000

(30) Foreign Application Priority Data

Oct. 30, 1998 (DE) .......................................... 198 50 293

(51) Int. Cl.[7] .................................................. H02J 1/00
(52) U.S. Cl. ............................ 307/70; 307/43; 235/385
(58) Field of Search .............................. 307/43, 64, 70; 235/380

(56) References Cited

U.S. PATENT DOCUMENTS

| 4,105,156 A | * | 8/1978 | Dethloff ........................ 235/441 |
| 4,498,000 A | * | 2/1985 | Decavele et al. ............ 235/380 |
| 4,575,621 A | * | 3/1986 | Dreifus ......................... 235/380 |
| 4,614,861 A | * | 9/1986 | Pavlov et al. ................ 335/380 |
| 4,650,981 A | * | 3/1987 | Foletta ......................... 235/449 |
| 4,827,111 A | * | 5/1989 | Kondo .......................... 335/380 |
| 5,241,160 A | * | 8/1993 | Bashan et al. ............... 235/380 |
| 5,754,462 A | * | 5/1998 | Little ............................ 364/900 |

FOREIGN PATENT DOCUMENTS

GB         2275654 A         *    7/1994

* cited by examiner

Primary Examiner—Brian Sircus
Assistant Examiner—Sharon Polk
(74) Attorney, Agent, or Firm—Daniel J. Piotrowski

(57) ABSTRACT

In a data carrier with a data processing device in which there is provided an external as well as an internal power supply, it is proposed to provide at least one switching means in which is accommodated in the data carrier in order to realize temporary decoupling of the external power supply, thus making the retrieval of sensitive data impossible.

4 Claims, 1 Drawing Sheet

DATA CARRIER WITH PROTECTION AGAINST SPY OUT

BACKGROUND OF THE INVENTION

1. Field of the Invention

The invention relates to a data carrier with a data processing device as well as to an electronic component with a data processing device for such a data carrier.

2. Description of the Related Art

Recently doubts have arisen as regards the security of data carriers, it being claimed that security-relevant data can be discovered by observation of the power consumption of such a data carrier.

SUMMARY OF THE INVENTION

It is an object of the invention to ensure that such attempts cannot be successful.

This object is achieved according to the invention in that a data carrier with an external power supply is also provided with an internal power supply, at least one switching means being provided in the data carrier in order to realize temporary decoupling of the external power supply.

The advantage of the invention resides in the fact that the decoupling of the external power supply, preferably during security-relevant operations or at least partly during security-relevant operations of the data processing device, frustrates such attempts to fraud.

Advantageous embodiments of the invention are described in the dependent Claims.

The invention will be described in detail hereinafter.

Data carriers provided with data processing devices, for example so-called chip cards, incorporate a test function for the protection of security-relevant transactions, for example the dispensing of cash in money-dispensing machines; such a test function serves to test the authorization for the transaction. In order to establish proof of authorization, use is made of, for example so-called Personal Identification Numbers (PIN). The PIN can be tested in the data processing device of the data carrier while utilizing key algorithms. The power supply for the data carrier is customarily realized by way of contacts or by induction of alternating currents which are converted into a direct current in the data carrier.

DETAILED DESCRIPTION OF THE PREFERRED EMBODIMENTS

Figure 1:
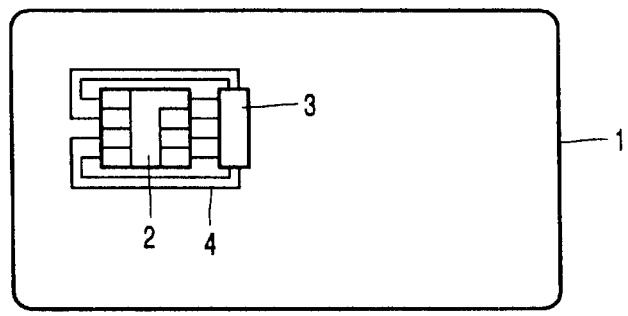
FIG. 1 shows a chip card.

FIG. 1 shows a so called chip card 1 with a contact field 2 and an embedded chip 3. The chip 3 is connected to the contact field 2 via internal wires 4.

In order to preclude with certainty, at least during testing of the transaction authorization, the retrieval of information regarding the authorization key via the externally applied and hence measurable current consumption, or via the signals applied via the current leads, the supply leads to the external current source are decoupled by means of decoupling means, for example switches. In this manner it is prevented that signals which are produced by internal operations can reach the environment. An internal power supply source is used for the power supply of the data processing device at least for this period of time. Suitable for this purpose are, for example, rechargeable batters or a solar cell 10 (shown in FIG. 2), illuminated by a read apparatus, or capacitors which are proportioned so that the power supply is ensured at least during the decoupling time. Power supply beyond that time is not required so as to insure the intended decoupling step the duration of the decoupling for the purpose of disguising the operating time can be controlled not only by the data processing device itself but also, for example in a time-controlled manner or until the energy of the internal power supply source for has decreased to a given value.

Figure 2:
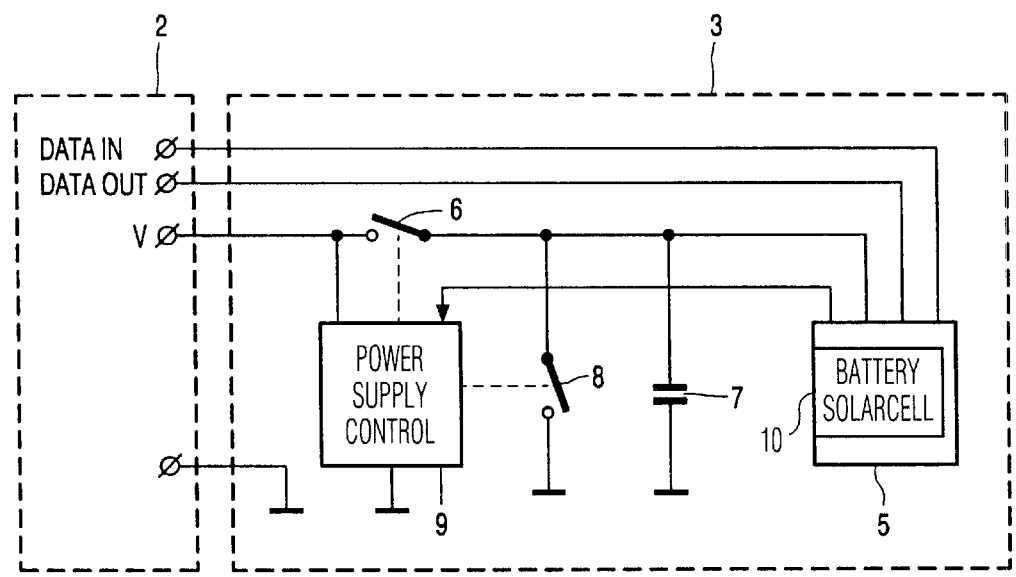
FIG. 2 shows a schematic of the chip card FIG. 1.

FIG. 2 shows the internal structure of a preferred embodiment of a chip 3. Inside the chip there is provided the data processing section 5 in which the security-relevant operations are carried out. To this end the data processing section 5 is connected to the contact field 2, i.e. to the contacts used for transmitting data from and to the data processing section 5. The current supply contact V of the contact field 2 is connected to a first switch 6 which is used as said decoupling device. The other end of the first switch 6 is connected to the power supply input of the data processing section 5. Also connected to this power supply input of the data processing section 5 are a capacitor 7 which is used as said internal supply source and a second switch 8 which is used as a discharging device. The first and the second switch 6,8 are controlled by a power supply control circuit 9. Preferably, the data processing section 5, the first and the second switch 6,8, the capacitor 7 and the power supply control circuit are arranged on a single chip so as to make it harder to deactivate parts of that arrangement by opening the chip card 1.

When the internal power supply sources cannot be proportioned so as to enable complete execution of the security-relevant operations during a single decoupling period, the security-relevant operations are preferably subdivided into a number of sub-operations; the internal power supply should then be capable of providing the power supply for at least each sub-operation. The circuit elements fed by the internal power source are thus decoupled from the external power supply at least during such sub-operations.

For example, the decoupling is triggered by switching means which are preferably arranged in such a manner that only weak coupling capacitances occur between internal and external power supply leads.

Additionally, in order to cover any capacitively coupled small signals or small signals arising by irradiation, noise or masking or superposition signals can be applied via the leads connected to the external power supply.

When a capacitor is used as an internal power supply source, for example supporting and smoothing capacitors provided on the chip can be used. These capacitors are discharged during the sensitive internal operations or sub-operations and recharged between the sub-operations, or after the operation, via the external power supply. Preferably, prior to such recharging the internal power supply source is always adjusted to the same discharged state or to different charging states due to incidental power consumption. Thus, sensible information as regards the arithmetic operations performed during the decoupling phase cannot be derived either by measurement of the current required for the recharging.

What is claimed is:

1. A data carrier comprising:

a data processing device;

means for connection to an external power supply that supplies power to the data processing device;

an internal power supply for supplying power to the data processing device only during a testing of transactions authorization, and at least one switching means being provided to connect the means for connecting the external power supply to the data processing device, so that only during said testing of transactions authorization the switching means temporarily decouples the means for connection to the external power supply from the data processing device.

2. A data carrier as claimed in claim 1, characterized in that the decoupling of the means for connection to the external power supply takes place at least partly during predetermined states of operation of a data processing section, wherein the data processing section signals a power control circuit to decouple the means for connection to the external power supply by opening the switching means.

3. A data carrier as claimed in claim 1, characterized in that a rechargeable battery, a capacitor or a solar cell is provided as the internal power supply.

4. A data carrier as claimed in claim 1, characterized in that prior to an end of the temporary decoupling of the external power supply there is performed a discharging operation or a loading operation of the internal power supply which is random controlled or takes place to a predetermined value.

* * * * *